(12) United States Patent
Wiley et al.

(10) Patent No.: US 6,990,609 B2
(45) Date of Patent: Jan. 24, 2006

(54) SYSTEM AND METHOD FOR ISOLATING FAULTS IN A NETWORK

(75) Inventors: Stephen A. Wiley, Arvada, CO (US);
John Schell, Westminster, CO (US);
Christian Cadieux, Louisville, CO (US)

(73) Assignee: Sun Microsystems, Inc., Santa Clara, CA (US)

( * ) Notice: Subject to any disclaimer, the term of this patent is extended or adjusted under 35 U.S.C. 154(b) by 523 days.

(21) Appl. No.: 10/172,302

(22) Filed: Jun. 13, 2002

(65) Prior Publication Data

US 2003/0233598 A1    Dec. 18, 2003

Related U.S. Application Data

(60) Provisional application No. 60/298,259, filed on Jun. 12, 2001.

(51) Int. Cl.
*G06F 11/00*    (2006.01)

(52) U.S. Cl. .......................................... 714/25; 709/224
(58) Field of Classification Search ................ 714/25, 714/27, 39, 43, 47, 49, 56, 32; 709/220, 709/221, 224, 223; 710/15, 17; 370/221, 370/223, 242
See application file for complete search history.

(56) References Cited

U.S. PATENT DOCUMENTS

| | | | |
|---|---|---|---|
| 5,239,537 A | | 8/1993 | Sakauchi ...................... 370/16 |
| 5,303,302 A | * | 4/1994 | Burrows ...................... 713/161 |
| 5,333,301 A | * | 7/1994 | Cheney et al. ................ 714/56 |
| 5,390,188 A | * | 2/1995 | Dawson ...................... 714/717 |
| 5,396,495 A | | 3/1995 | Moorwood et al. ...... 370/85.11 |
| 5,448,722 A | | 9/1995 | Lynne et al. |
| 5,519,830 A | | 5/1996 | Opoczynski ........... 395/182.02 |
| 5,574,856 A | | 11/1996 | Morgan et al. |
| 5,636,203 A | | 6/1997 | Shah .......................... 370/244 |
| 5,664,093 A | | 9/1997 | Barnett et al. |
| 5,987,629 A | * | 11/1999 | Sastry et al. .................. 714/48 |
| 6,006,016 A | | 12/1999 | Faigon et al. |
| 6,016,510 A | | 1/2000 | Quattromani et al. ....... 709/233 |
| 6,105,068 A | * | 8/2000 | Naudus ...................... 709/228 |
| 6,151,688 A | * | 11/2000 | Wipfel et al. ................. 714/48 |

(Continued)

FOREIGN PATENT DOCUMENTS

JP    2001156778    6/2001

OTHER PUBLICATIONS

"*Diagnostics Validation & Verification,*" pp. 1-12 [online] [retrieved on Sep. 25, 2003] Retrieved from http://www-.giordano.com/Help/Sect8.htm.

(Continued)

*Primary Examiner*—Nadeem Iqbal
(74) *Attorney, Agent, or Firm*—Meyertons Hood Kivlin Kowert & Goetzel, P.C.; B. Noël Kivlin (57) ABSTRACT

A fault isolation system in a network is disclosed, particularly suited for use in a unidirectional fibre channel arbitrated loop. Information relating to read and write errors occurring on the loop is stored, and fault regions are located by determining areas on the loop downstream of write errors and upstream of read errors. The system may be extended to networks with bidirectional communications by storing directionality information with the detected errors. Command and response error information is not needed to deterministically locate the fault regions. When a given fault region is identified, loop and device diagnostics are executed for that region of the loop to specifically identify the failed components.

20 Claims, 6 Drawing Sheets

U.S. PATENT DOCUMENTS

| | | | |
|---|---|---|---|
| 6,249,887 B1 | 6/2001 | Gray et al. | |
| 6,324,659 B1 | 11/2001 | Pierro | |
| 6,353,902 B1 | 3/2002 | Kulatunge et al. | |
| 6,414,595 B1 | 7/2002 | Scrandis et al. | |
| 6,442,694 B1 | 8/2002 | Bergman et al. | |
| 6,460,070 B1 | 10/2002 | Turek et al. | |
| 6,499,117 B1 | 12/2002 | Tanaka | |
| 6,556,540 B1 * | 4/2003 | Mawhinney et al. | 370/229 |
| 6,587,960 B1 | 7/2003 | Barford et al. | |
| 6,609,167 B1 * | 8/2003 | Bastiani et al. | 710/104 |
| 6,675,346 B2 * | 1/2004 | Tsunoda | 714/774 |
| 2002/0144193 A1 | 10/2002 | Hicks et al. | |
| 2002/0191602 A1 * | 12/2002 | Woodring et al. | 370/389 |
| 2002/0194524 A1 | 12/2002 | Wiley et al. | |
| 2003/0074471 A1 | 4/2003 | Anderson et al. | |

OTHER PUBLICATIONS

Qualtech Systems, Inc. "*Diagnostic Modeling of a Data Bus System TEAMS 4.0,*" by Somnath Deb, pp. 1-13 [online] Retrieved from http://www.teamqsi.com/doc/1553-report-.pdf.

U.S. Appl. No. 10/389,642 filed on Mar. 13, 2003, entitled "*Method, System, and Article of Manufacture for Fault Determination*" by G .G. Gibson; T. H. McKenney; C. Cadieux and P.C. Kiser.

U.S. Appl. No. 10/172,303, filed on Jun. 13, 2002, entitled, "System and Method for Rapid Fault Isolation in a Storage Area Network", invented by S.A. Wiley, W. Munson, and C. Cadieux.

* cited by examiner

| | Failure Downstream of Target Device | Failure Upstream of Target Device |
|---|---|---|
| Write Events | -Failure on WRITE RESPONSE (Example 2, case 5: Ignore) | -Failure on WRITE COMMAND (Example 1, case 5: Ignore)<br><br>➤ Failure on DATA WRITE (Example 1, case 4: SCSI Parity Error) |
| Read Events | -Failure on READ RESPONSE (Example 2, case 3: Ignore)<br><br>➤ Failure on DATA READ (Example 2, case 2: CRC Error) | -Failure on READ COMMAND (Example 1, case 1: Ignore) |

*Read (R) and Write (W) Errors by Device Number*

Read (R) and Write (W) Errors by Device Number

SYSTEM AND METHOD FOR ISOLATING FAULTS IN A NETWORK

This patent application claims the priority of Provisional Patent Application No. 60/298,259 filed Jun. 12, 2001, which is incorporated herein by reference.

BACKGROUND OF THE INVENTION

The present invention relates to a system and methods for isolating faults in a network, particularly in a fibre channel arbitrated loop (FCAL) or other multidevice computer system in which one or more components may fail.

Locating faults in a network such as an FCAL is a challenging and time-consuming undertaking, in particular where the loop includes many devices, each of which may undergo intermittent failures. In systems currently in use, logs are kept of failed commands, data transfers, responses, etc., so that diagnostics may be performed in attempting to locate the sources of failures.

Such diagnostics typically involve attempts to replicate a given fault condition, often in a trial-and-error manner, removing and/or replacing components until a faulty component is identified. This is a nondeterministic approach, since intermittent faults by definition do not occur every time a given state of the network occurs (e.g. a given FCAL configuration with a given I/O command). Thus, an engineer may spend a considerable amount of time and resources fruitlessly attempting to isolate an FCAL error, and additionally may replace more components than necessary, i.e. may replace nonfailing components along with a failed component, due to insufficient knowledge about the location of a failure.

Thus, fault isolation techniques can result in wasted time, efforts and equipment. In addition, the difficulties inherent in fault isolation using current techniques can lead to extended periods of down time for a system or subsystem, and a local error can thus have a broad effect, affecting the productivity of all users on the loop or network.

Accordingly, a system is needed that can isolate errors in a network in a manner that is at best deterministic and at worst at least reduces trial-and-error attempts to locate failing components relative to current methods.

SUMMARY OF THE INVENTION

A system and method are presented for isolating fault regions in a processor-based network or loop, such as a fibre channel arbitrated loop, include logic and program modules that are configured to analyze error logs relating to read and write errors that occur in the network. Rapid isolation of a failure region can be accomplished by determining those devices for which data read errors occur, and by the observation that read data errors are likely to occur for failure regions downstream of a given device, while write data errors are likely to occur for failure regions upstream of a given device. Information concerning command and response errors is not needed to determine the location of the failure region.

DESCRIPTION OF THE PREFERRED EMBODIMENTS

Figure 1:
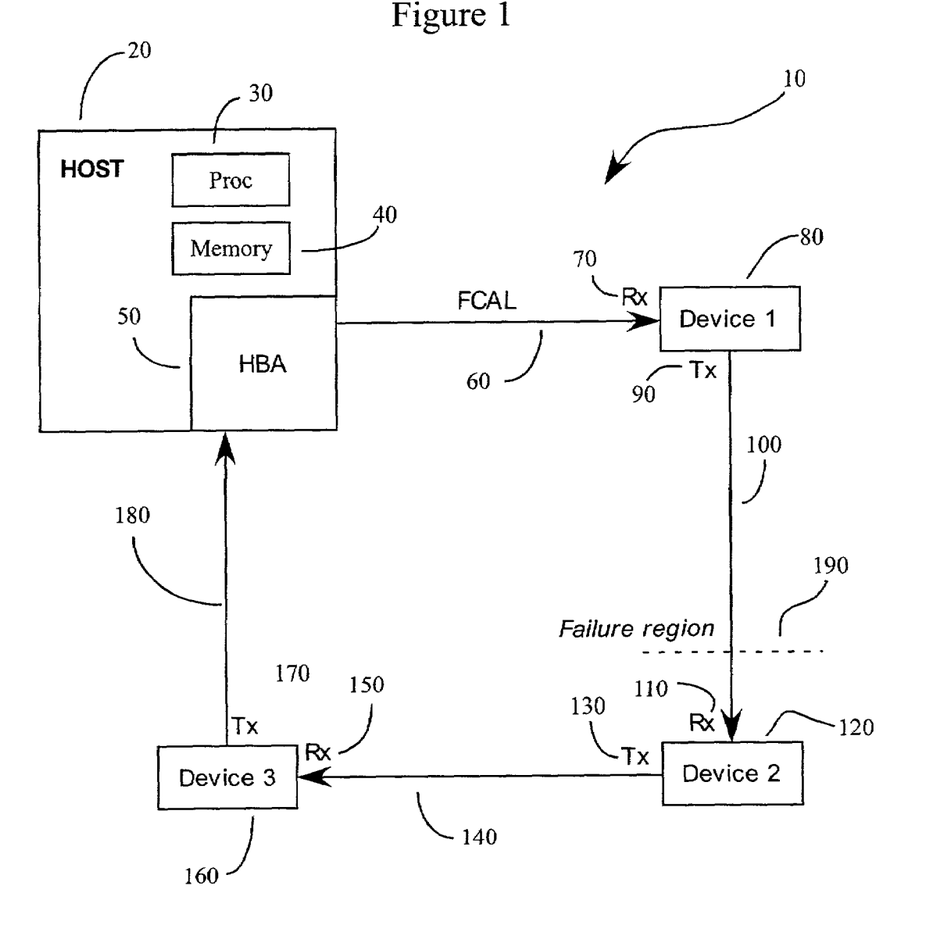
FIG. 1 is a block diagram of a fibre channel arbitrated loop (FCAL) appropriate for use in connection with the present invention.

As shown in FIG. 1, a fibre channel arbitrated loop (FCAL) or other network 10 in connection with which the present invention may be used includes a processor-based host 20, which may be a conventional computer, server or the like, having at least one processor 30 executing instructions or program modules stored in memory 40. It will be understood that other components conventionally used in a processor-based system will be used, though not shown in FIG. 1, such as input-output (I/O) components and logic, disk or other storage, networking components and logic, user interface components and logic, etc.

For the purposes of the present application, the term "logic" may refer to hardware, software, firmware or any combination of these, as appropriate for a given function. Similarly, a "program module" or a program may be a software application or portion of an application, applets, data or logic (as defined above), again as appropriate for the desired functions. Program modules are typically stored on hard disk or other storage medium and loaded into memory for execution.

The host 20 includes or communicates with a host bus adapter (HBA) 50, which controls packets (commands, data, responses, idle packets, etc.) transmitted over the FCAL 10.

In this exemplary configuration, the HBA communicates over a first loop segment 60 via a receive module 70 with a first device 80. The devices on the FCAL 10 may be any devices suitable for communication with a network, including wired or wireless devices that may be in a given loop. Typical devices at nodes in a network would be storage devices in a storage area network (SAN), servers, and so on.

Device 80 passes data, commands, responses and other network packets via a transmit module 90 over segment 100 to a receive module 110 of device 120, which likewise transmits packets via transmit module 130 over segment 140 to receive module 150 of device 160. Finally, device 160 sends packets via transmit module 170 over segment 180 back to the HBA 50.

As many or as few nodes or devices such a devices 80, 90 and 100 may be used in the system. The receive and transmit modules may be components separate from the network devices, or may be in at least some cases integral to some of the devices.

EXAMPLE 1

Failure Region Upstream of a Target Device

In a typical FCAL system, a command such as a read or write command addressed to a specific target is transmitted from the HBA 50. If, for instance, a read command is sent to device 120, then it is sent to device 80 along segment 60, and device 80 forwards it to device 120 without taking any other substantive action, since the command packet is not addressed to device 80.

Figure 2:
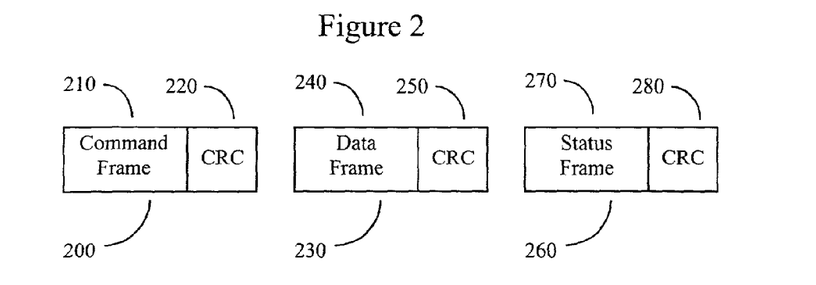
FIG. 2 shows data structures or packets usable in an fibre channel arbitrated loop as shown in FIG. 1.

When the read command packet reaches device 120, the device executes the command (e.g. by retrieving the requested information from a file), sends response and data packets to the host 20 (via segments 140 and 180). This may be done in a variety of suitable fashions in different types of networks, and as shown in FIG. 2 at a minimum each data packet will include a frame with associated cyclic redundancy check (CRC) information, used to detect errors in a given packet. Thus, a command packet 200 includes a command frame 210 and CRC data 220; a data packet 230 includes a data frame 240 and CRC data 250; and a status frame 270 includes status frame and CRC data 280.

If there is a failure in the FCAL, such as somewhere along segment 100 as indicated by the failure region 190 in FIG. 1, then packets passing through that failure region may not be transmitted correctly. Since failures are often intermittent, it may be that some packets are transmitted successfully while others are not. Thus, it may be that a read command targeting device 120 arrives without corruption, and the device 120 can detect this by checking the CRC information. If this occurs, then the device 120 can send a response packet indicating successful receipt of the read command, and can additionally send the read data packet(s) themselves back to the HBA.

In this example, since the failure region 190 is earlier or "upstream" in the loop from the device 120, once the read command reaches device 120 there will be no problem in sending the response and data packets, if there are no other failure regions at this time in the FCAL 10. However, if the host 20 sends a write command to the device 120, this will be followed by the write data itself, and even if the write command arrives at device 120 uncorrupted, it may be that some portion of the write data is sent over segment 100 while a failure is occurring. In this case, the write data will likely be corrupted, so that device 120 either does not receive the data at all (e.g. because the target address was corrupted) or determines from the CRC data that one or more packets were damaged.

If the target address was corrupted, a timeout error is likely, i.e. the host 20 determines that it has not received a suitable response from device 120 within some predetermined time period. If the device receives the data, but the CRC information indicates an error, then a response indicating this is sent to the host 20. In either case, a log is kept of each error, the time of occurrence, and the associated type of action, packet and device, segment, node or other type of component in connection with which the failure occurred. Subsets and variations on the exact error data logged are possible, as will be appreciated below.

The error data may be stored at the host 20 or in some other storage device or medium connected to the network. In general, any device (including any storage medium) for storing data, such as disks, tapes, RAM or other volatile or nonvolatile memory may be used. Similarly, logic and/or program configured to implement the invention may be stored on any storage device and/or computer-readable medium, and may be executed on the host or any other suitable processor-based system.

In this example, a read request was successfully completed if it reached device 120 without error, but a write request was unsuccessful, even though the request itself arrived without corruption. This is behavior that is likely to occur when the failure region is upstream of the target device. Of course, it is also possible that in the case of a write request, the write data would successfully traverse the failure region 190, reaching device 120 without corruption. Thus, the error log for this example could show several types of entries:

(1) read requests that were sent by the host 20 but failed to reach device 120 intact;

(2) read requests that arrived at device 120 intact and were successfully responded to;

(3) write requests that arrived at device 120 and were followed by successfully transmitted write data and a successful write response;

(4) write requests that arrived at device 120 and were followed by write data that was corrupted in transmission or otherwise did not arrive successfully at the HBA 50; and (5) write requests that fail to reach device 120 intact.

EXAMPLE

Failure Region Downstream of a Target Device

If instead the target device for read and write requests is device 80, or some other device upstream of a failure region such as failure region 190, then different error data will be exhibited. In this case, a read request that successfully reaches device 80 may not successfully be fulfilled, since the transmitted data may be corrupted in traversing the failure region 120. If the failure region is not failing at the time of transmission, however, the read data may be transmitted successfully.

However, if a write command is sent to the device 80, the write data itself will be transmitted successfully, since there is no failure region between the HBA 50 and the device 80. In this case, device 80 will send a response indicating successful receipt of the data. That response packet may or may not reach the HBA intact, because of the failure region 190—but for any write response that does arrive intact for device 80, a successful write operation will be reflected, absent a failure region upstream of device 80.

Thus, an error log relating to commands sent to a device 80 upstream of a failure region 190 could include entries indicating:

(1) read requests that were sent by the host 20 to the device 80, which then sent read data that was corrupted in transmission or otherwise did not arrive successfully at the HBA 50;

(2) read requests that arrived at device 120 and were successfully responded to;

(3) read requests that arrived at device 120 intact and were followed by successfully transmitted read data, but where the read response failed to reach the HBA 20 intact;

(4) write requests that arrived at device 120 and were followed by successfully transmitted write data, where the write response reached the HBA 20 intact; and (5) write requests that arrived at device 120 and were followed by successfully transmitted write data, but where the write response did not reach the HBA 20 intact.

In both Example 1 and Example 2, it is possible to store many other types of error data in the log. However, the foregoing is sufficient to illustrate the operation of embodiments of the present invention.

It will be noted that when a target device (e.g. device 80) is upstream of a failure region, write requests are successful (Example 2, cases 4 and 5), while read requests may be unsuccessful (Example 2, case 1) or, even if they are successful, the read response may fail (Example 2, case 3). When a target device (e.g. device 120) is downstream of a failure region, read requests that arrive intact are successful (Example 1, case 1), while write requests that arrive intact may still be unsuccessful because of corruption of the ensuing write data (Example 1, case 4).

For each of Examples 1 and 2, two cases involve successful operations while three cases involve some kind of failure. The failures (Example 1, cases 1, 4 and 5; and Example 2, cases 1, 2 and 5) are logged, and are summarized in the logic table of FIG. 3. As will be seen in the following discussion, it is sufficient to isolate the fault region if Example 2, case 2 and Example 1, case 4 are examined, and thus the other failure cases (involving failures of the commands or of the responses) need not be inspected.

The location of a given target device is relevant to the analysis of failure data relative to that device in isolating a fault region. In the present example, a simplex (unidirectional) fibre channel network or loop is discussed. However, the concepts of the invention may also be applied to full duplex or half-duplex (i.e. bidirectional) network connections, in which case the directionality data relating to each error should be stored and used in the fault analysis. For example, in an Ethernet network packets are sent in both directions along the Ethernet segments, which could make fault isolation difficult, unless transmission and target node information is used to determine the directionality of the operations that result in errors. If this is done, then the principles of the present invention can be applied to isolate failing component.

Figure 4:
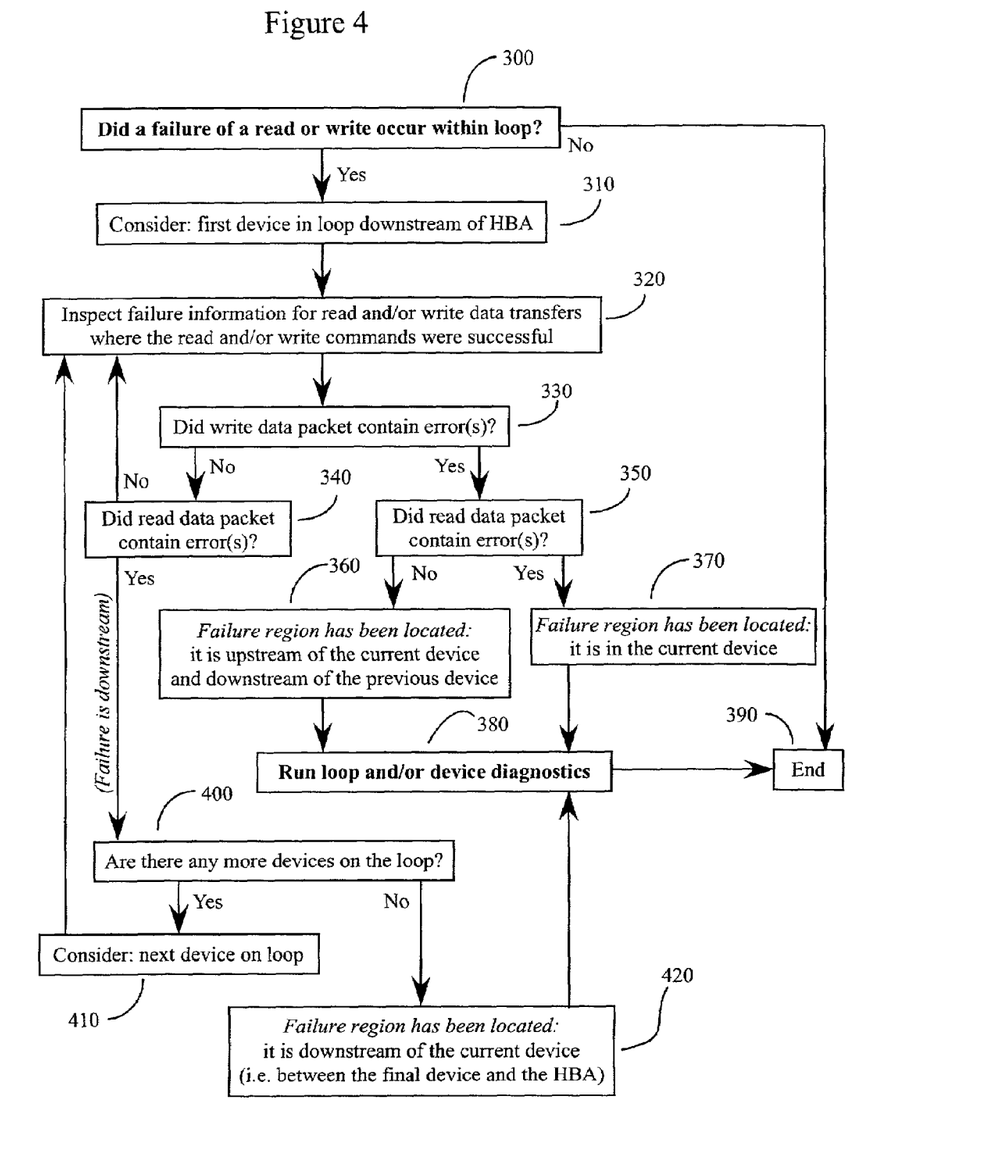
FIG. 4 is a flow chart reflecting implementation of an embodiment of the method of the invention.

FIG. 4 is a flow chart reflecting an appropriate method according to the invention. The method may be implemented as a program or other logic executed within the host 20 or any other processor-based system, based upon failure data generated and stored due to operation of the FCAL 10 or another network. The method may be implemented as a At step (box) 300, if a failure has occurred, the first device in the loop downstream of the transmitting device (such as an HBA) is considered (see box 310). At box 320, the method inspects failure information for read and/or write requests where the commands themselves were successfully transmitted, but the read or write data did not arrive intact at the requesting device (here, the HBA 50).

The cases where there was a failure due to a command failing to reach the device, or a response failing to arrive intact back at the HBA, are not used in this implementation, though they may provide additional diagnostics in alternative embodiments. Thus, the errors illustrated in FIG. 3 relating to write response, read response, write command and read command are marked "Ignore", while the failures on data read and data write are used in the embodiment of the invention relating to the flow chart of FIG. 4.

Figure 3:
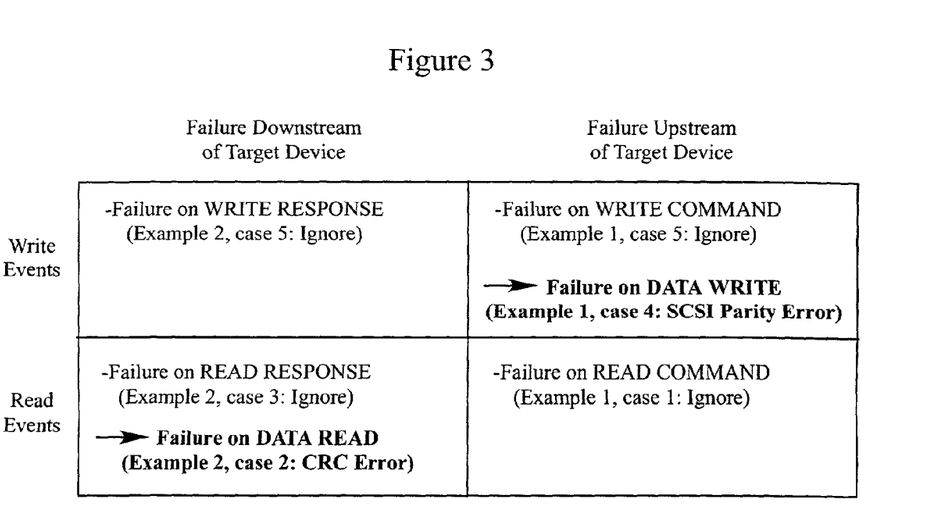
FIG. 3 is a logic table indicating likely locations of component failures based upon types of errors.

At box 330, the method determines whether at least one write data packet for the current device (i.e. a given device in the loop, such as, in this first iteration, the first device 80 downstream of the HBA 50) had an associated error. If so, then as seen in FIG. 3, that may be an indication that a failure region is located upstream of the target device. In the example of FIG. 1, failure region 190 is downstream of device 80, so the outcome of the determination of box 330 is for that example negative, and the method proceeds to box 340. If no read packets contained errors, then the method proceeds to box 320, and the next device is considered.

However, if enough error data has been logged, it is likely that there will be read errors recorded for device 80 due to failure region 190. In this case, the method determines that at least one read packet contained an error, and proceeds to step 400. A system according to the invention preferably stores the information that a failure has occurred downstream of the device currently under consideration; see line connecting boxes 340 and 400 in FIG. 4, as well as Example 2, case 2 discussed above and depicted in FIG. 3.

If there is at least one additional device on the look (box 410), the method proceeds to box 320 to inspect the failure data for that next device. If there are no more devices (i.e. components of any kind) on the loop (box 420), then the failure region has been located: since it is downstream of the device under consideration and there are no additional components in the system, the failure must have occurred between the current device (which is the "last" device in the loop) and the HBA. Conventional loop and/or component/device diagnostics may then be executed to specifically identify the failure, and the failed component can be repaired or replaced.

In the present example, there are additional devices (120, 160) on the loop, so the method proceeds to box 320, and the failure data relating to device 120 is considered. In this case, it will be determined that Example 1, case 4 is met, i.e. failures on data write packets will be identified. Thus, at box 330, the method proceeds to box 350, where it is determined that there were no data read packet errors. The method proceeds to box 360, where it is determined that the failure region is upstream of the current device and downstream of the previous device. If the current device is the first device on the loop, then the "previous device" is simply the HBA or other transmitting device. At this point, diagnostics are executed at box 380.

There is no need at this point to further inspect the errors logged (e.g. data write errors) with respect to device 160, because the failure region has already been located as being upstream of device 120.

It is possible, if insufficient data is gathered, that no data read errors would have been logged with respect to device 80, although the failure region 190 is downstream of that device. In this case, the data write failures for device 120 would still locate the failure region as being upstream of device 120, but device 80 would not contribute to narrowing down the possible failure location. Thus, logging more error data will lead to a greater likelihood of quickly locating a failure region.

Note that if both data read and data write errors occur in connection with a given component, then the failure region must be within that component. This case is indicated at box 370.

Figure 5:
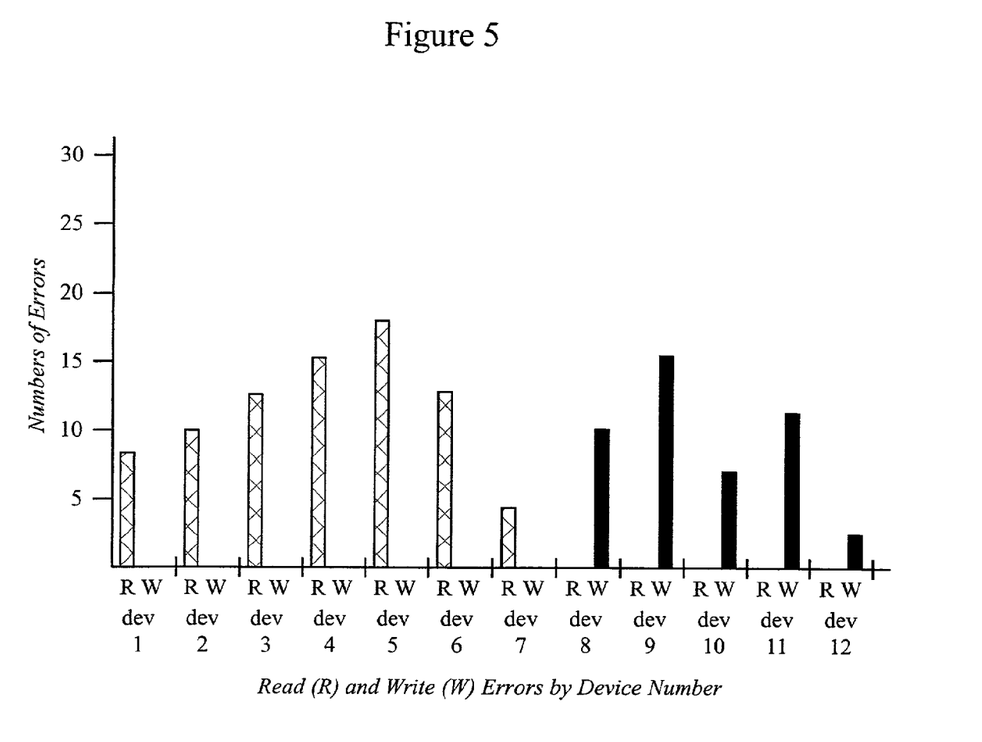
FIGS. 5–7 are histograms showing examples of error logs under different circumstances for an FCAL.
Figure 6:
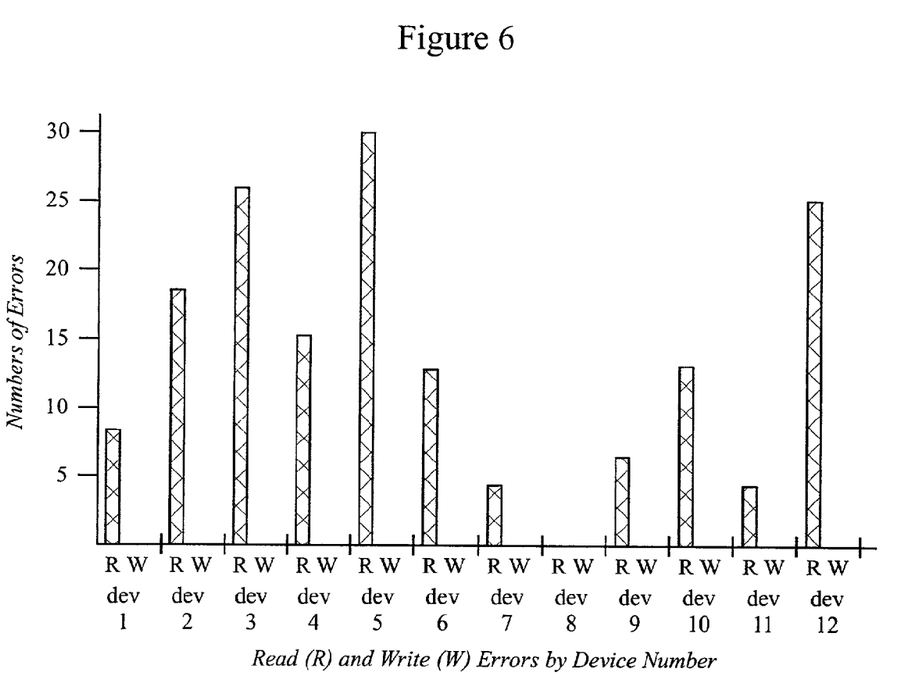
Figure 7:
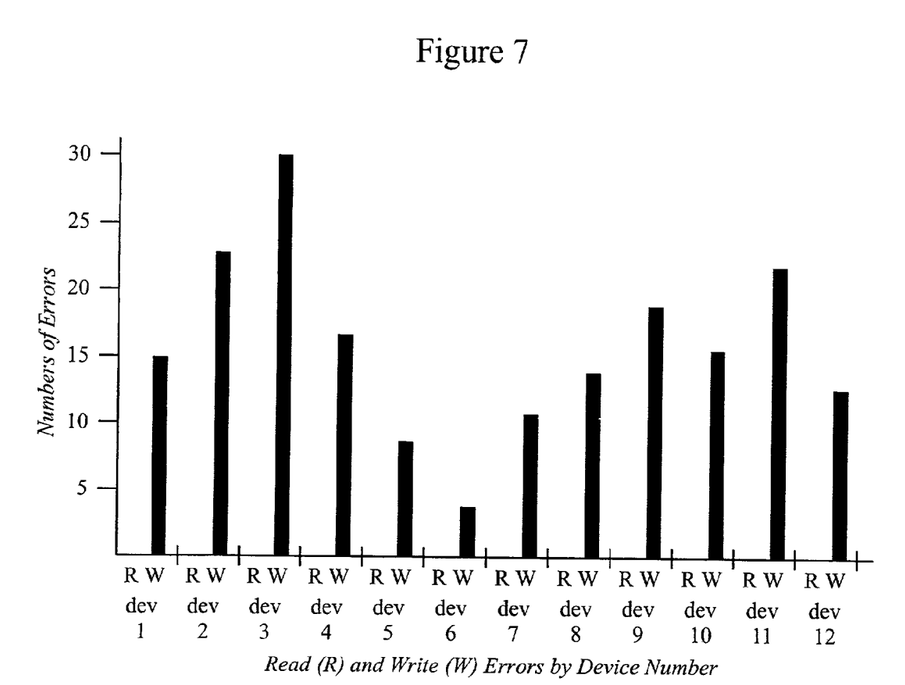

This method thus deterministically locates failure regions as being between two devices on a loop, where error data has been logged sufficient to identify read data and write data errors with respect to both devices. Examples of such data are shown in FIGS. 5–7, in which errors relating a system with twelve components (dev 1–dev 12) are depicted. Thus, an error log might indicate that there were 8 read data errors for device 1, 10 read data errors for device 2, etc. The errors for devices 1–7 are all read data errors, while the errors for devices 8–12 are all write data errors. According to the above method of the invention, the failure region must therefore be between devices 7 and 8.

In FIG. 6, the errors for all twelve devices are read errors (except for device 8, which in this example exhibited no errors), and thus the failure region must be downstream of the last device, i.e. between the last device and the HBA. In this example, the method of FIG. 4 would iterate through boxes 320, 330, 340, 400 and 410 until the last device on the loop was reached, at which point it would proceed to box 420, identifying the failure region as noted.

In FIG. 7, the errors for all twelve devices are write errors. Thus, the failure region must be upstream of all twelve devices, and is accordingly between the first device and the HBA. In this example, the method of FIG. 4 would follow boxes 320, 330, 350 and 360, and in the first iteration would locate the failure region.

In the case of a bidirectional network where directionality is stored for the individual errors, it is possible to apply the concepts of the invention in a straightforward extension by considering either two read or two write errors that occurred were sent in different directions on the network, but whose intersection locates a fault. For instance, a fault region could lie between a first location and a second location, where a read error occurred downstream of the first location for a packet being sent in a first direction, but another read error occurred downstream of the second location relative to the opposite of the first direction (downstream for the second direction being upstream relative to the first direction). This is analogous to the concept of locating a fault region downstream of a read error but upstream of a write error for a unidirectional loop, as in FIG. 4.

As a further extension of the bidirectional embodiment, other combinations of read and write errors (or other types of errors) can be considered, as long as the fault location is identified as being at the intersection of the errors, taking directionality into account, as taught generally by the method of FIG. 4.

A system and method according to this invention are particularly useful in identifying intermittent failures in a network before complete failure of a device. It is while the failures are transient that the important data can be logged, and then used in the above-described method. This can lead to rapid and efficient failure isolation.

Note that if the loop itself is completely down, due e.g. to catastrophic failure of a component, nothing at all gets through—no idle frames, commands, etc. It is more typical, however, that a failing loop will undergo transient failures of a few microseconds, resulting in intermittent errors of the types discussed above. Even such a short down time will likely result in a CRC error.

Perl code appropriate for an implementation of the present invention is attached hereto as Appendix A. Other specific implementations of program modules or logic may be equally appropriate for various embodiments of the invention.

What is claimed is:

1. An error isolation system adapted for use in a computer network in communication with a storage device configured to store error information relating to at least one detected error that occurs in the network, the system having a plurality of program modules configured to execute on at least one processor, the program modules including:
   an error identification module configured to determine whether the detected error is a write error or a read error; and
   a failure region detection module configured to identify a failure region on the network, the failure region being between a first location on the network at which a write error is detected and a second location on the network at which a read error is detected.

2. The system of claim 1, wherein:
   the network includes at least one unidirectional loop; and
   the failure region detection module is configured to isolate errors occurring within the unidirectional loop.

3. The system of claim 2, wherein the unidirectional loop comprises a fibre channel arbitrated loop.

4. The system of claim 2, wherein the failure region detection module is further configured to identify the failure region as being within an intersection of at least two detected errors.

5. The system of claim 4, wherein the two detected errors include a read error and a write error.

6. The system of claim 2, wherein the failure region detection module is further configured to identify the failure region as being downstream of a first read error and upstream of a first write error.

7. The system of claim 1, wherein:
   the network includes at least one bidirectional loop;
   the failure region detection module is configured to isolate errors occurring within the bidirectional loop; and
   the error identification module is configured to identify, for each detected error, a directionality on the bidirectional loop for that detected error.

8. The system of claim 7, wherein the failure region detection module is further configured to identify the failure region as being within an intersection of at least two detected errors.

9. The system of claim 8, wherein:
   the failure region detection module is further configured to identify the failure region as being downstream of a first read error and upstream of a first write error;
   wherein the directionality of the first read error is the same as the directionality of the first write error.

10. The system of claim 8, wherein:
    the failure region detection module is further configured to identify the failure region as being downstream, relative to a first directionality, of a first read error and downstream, relative to a second directionality, of a second read error.

11. The system of claim 8, wherein:
    the failure region detection module is further configured to identify the failure region as being upstream, relative to a first directionality, of a first write error and upstream, relative to a second directionality, of a second write error.

12. A method for locating a fault region in a network in communication with a storage device configured to store error information relating to detected errors that occurs in the network, the method including the steps of:
    determining whether each of a plurality of detected errors is a read error or a write error; and
    identifying a failure region on the network between a first location on the network where a first read error is detected and a second location on the network where a first write error is detected.

13. The method of claim 12, wherein the identifying step includes identifying the failure region as being within a unidirectional portion of the network.

14. The method of claim 12, wherein the identifying step includes identifying the failure region as begin within a fibre channel arbitrated loop.

15. The method of claim 12, wherein the identifying step includes identifying the failure region as being downstream of a detected read error and upstream of a detected write error.

16. The method of claim 12, wherein the identifying step includes identifying the failure region as being within a bidirectional portion of the network.

17. The method of claim 16, wherein the identifying step includes determining an associated directionality for each of the plurality of detected errors.

18. A computer program product stored on a computer-usable medium, comprising a computer-readable program configured to cause a computer to control execution of an application to determine a fault region associated with a plurality of detected errors in a network, the computer-readable program including:

an error identification module configured to determine whether each of the plurality of detected errors is a write error or a read error; and a failure region detection module configured to identify a failure region on the network, the failure region being between a first location on the network at which a write error is detected and a second location on the network at which a read error is detected.

19. The computer program product of claim 18, wherein the failure region detection module is configured to identify the failure region as being upstream of a first detected write error and downstream of a first detected read error.

20. A computer network, including:

a host including a processor and a host bus adapter;

a loop coupled to the host bus adapter and configured to carry packets from the host bus adapter to at least one device on the loop and from the device to the host bus adapter;

first logic coupled to the host and configured to detect a plurality of errors in the packets on the loop, the errors including at least one detected read error and one detected write error; and second logic coupled to the host and configured to locate a failure region on the loop downstream of the detected read error and upstream of the detected write error.

* * * * *